US006225886B1

(12) United States Patent

Kleinert et al.

(10) Patent No.: US 6,225,886 B1

(45) Date of Patent: May 1, 2001

(54) ELECTROMAGNET

(75) Inventors: Dieter Kleinert; Horst Wassermann, both of Memmingen (DE)

(73) Assignee: Dipl.-Ing. Wolfgang E. Schultz, Memmingen (DE)

( * ) Notice: Subject to any disclaimer, the term of this patent is extended or adjusted under 35 U.S.C. 154(b) by 0 days.

(21) Appl. No.: 09/246,542

(22) Filed: Feb. 8, 1999

(30) Foreign Application Priority Data

Feb. 9, 1998 (DE) ............................................ 198 05 049

(51) Int. Cl.[7] ................................ H01F 3/00; H01F 7/08; F16K 31/02

(52) U.S. Cl. .......................... 335/257; 335/262; 335/270; 335/277; 251/129.15

(58) Field of Search .................................... 335/255, 257, 335/261, 262, 270, 271, 277; 251/129.01–129.22

(56) References Cited

U.S. PATENT DOCUMENTS 4,014,425 * 3/1977 Gijzen et al. ........................ 335/257
4,790,345 * 12/1988 Kolchinsky .......................... 137/269
5,775,670 * 7/1998 Osterbrink ...................... 251/129.15
6,054,777 * 4/2000 Soh .................................... 290/38 R

FOREIGN PATENT DOCUMENTS 3132396 3/1983 (DE) .

* cited by examiner

*Primary Examiner*—Ray Barrera

(74) *Attorney, Agent, or Firm*—Jacobson, Price, Holman & Stern, PLLC

(57) ABSTRACT

The invention relates to an electromagnet, comprising a coil (30) which can be supplied with current and which thus generates a magnetic field and moves an armature (11) when supplied with current, and wherein the armature (11) serves for controlling a valve or another element. In order to improve the running properties of the armature (11), it is proposed that the armature (11) runs on a plastics sliding surface (2), in particular a sliding film (20) made of plastic.

8 Claims, 4 Drawing Sheets

ELECTROMAGNET

BACKGROUND TO THE INVENTION

The invention relates to an electromagnet, comprising a coil which can be supplied with current and which thus generates a magnetic field and moves an armature when supplied with current, and wherein the armature serves for controlling a valve or another element, the movement of the armature being damped by one or more damping elements.

Aforementioned electromagnets are widely used in the field of engineering. They serve, for example in textile machines, for a rapid weft insertion.

The above-described electromagnets also serve, however, for the control of gaseous and liquid media (in particular in liquid or hydraulic circuits), for example in a valve or as a control electromagnet or solenoid in applications where service life and time are critical.

Use in weaving machines or other textile machines, particularly, demands a high performance of electromagnets. The electromagnets are expected to achieve extremely high service-life requirements and switching frequencies. This results in considerable mechanical stresses on the electromagnet and the movably mounted elements.

German patent 31 32 396 describes an electromagnet which uses resilient elements as damping bodies which absorb the kinetic energy of the armature and thus avoid premature wear of the electromagnet.

In order to achieve the high clock frequencies, corresponding accelerations of the armature must be achieved. Particular importance is attached in this regard to the bearing of the armature, since an inaccurate bearing of the armature can lead to unequal stress on the damping elements, which then wear preferentially at these locations, and then jeopardizes the entire usability of the device.

Owing to the high frequencies, there is also considerable development of heat in the magnet coil. This leads, for reasons of design, to larger air gaps in order to allow constructionally for the thermal expansion of the components. However, on the other hand, this limits the effective magnet gaps and thus reduces the efficiency of the device.

BRIEF SUMMARY OF THE INVENTION

The object of the invention is to improve electromagnets as described above in such a way that they have a longer average service life and a higher efficiency.

To achieve this object, the invention starts out from an electromagnet comprising a coil which can be supplied with current and which thus generates a magnetic field and moves an armature when supplied with current, and wherein the armature serves for controlling a valve or another element, the movement of the armature being damped by one or more damping elements. According to the invention, the armature runs on a plastic sliding surface, in particular a sliding film of plastic, such as a plastics film on which the armature slides. The use of a film is a clever way to solve the problem of the thermal expansion, since the inserted film undergoes little thermal coupling by virtue of the small degree of mechanical contact with the rest of the device and thus a smaller constructional air gap is necessary. It has also been found that the film bearing serves for a precise and low-wear bearing of the armature, whereby transverse forces or misalignments of the armature are optimally compensated for, leading to a comparatively uniform loading of the damping elements. As a result, unequal wear of the damping elements is avoided, thereby resulting in a high reliability and long service life of the electromagnet.

The film bearing has proved to be particularly wear-resistant. The thin-walled film means a saving of space without impairing the mechanical reliability or stability. Small and relatively accurately definable bearing gaps reduce the air-gap losses at the magnetic transition, thereby improving the magnetic properties of the magnet and thus also increasing the efficiency. There is also an advantage here in terms of the production of the device. In the known armature guides, the armature runs on the inner surface of a tube. This tube was produced, for example, by making a bore in a solid material. For armature guidance which is as precise as possible, it was necessary to make the bore in the tube as accurately as possible. This high outlay is saved by the proposal according to the invention. There are no longer any exacting requirements to be considered as regards the surface quality of the tube, since this task is taken on by the plastic running surface, in particular by the inserted film. The solution according to the invention thus leads to a lower-cost construction and a simpler assembly of the device.

Besides the use of a plastic film, it is also possible to allow the armature to slide on a suitably designed plastic surface. In this case, this surface takes on the task of the film.

A further advantage of the design according to the invention lies, in particular, in the possibility to compensate for dimensional tolerances during the production of the electromagnets by suitable variation of the thickness of the film. Hitherto, magnets which had too great a dimensional tolerance were automatically rejected, since the excessively large air gaps limited the performance or efficiency of this device and thus were no longer usable for certain applications. Since the movable armature slides on a plastic sliding surface, the thickness of this surface can be adapted so that optimal conditions exist. It is thus possible, by suitable selection of the film thickness, to compensate for dimensional tolerances during production, when testing the devices. This advantage also arises when the devices are being overhauled. If the device is worn, in particular at the movable parts, owing to the long lifetime, it is possible to overhaul and restore the device simply and at low cost by suitably exchanging these movable parts and the plastic sliding surface cooperating therewith, and where appropriate a thicker sliding surface. The advantages resulting therefrom in terms of reusability and recyclability of the costly devices are obvious.

Besides the use of a plastic film, there is provision, for example, in the known armature guide for the use of a bush fabricated from special plastic, on the inner surface of which the armature slides. A further variant which is possible is a plastic coating on the inner surface of the armature guide facing the armature.

The use of the plastic film enables the film to be dismounted more easily, in particular when the armature can be removed simply from the core. In the event of the film being worn, it can be easily be exchanged and the device rendered usable again.

In a preferred design of the invention, a modular construction of the electromagnet is provided in which, for the armature with the armature guide and the coil, there is provided in each case a separate assembly which are releasably connected to one another. Such a design results in a simpler and lower-cost construction and assembly of the electromagnet. It is also possible to perform simple maintenance of the electromagnet, since the appropriate assemblies can be exchanged as required. A releasable connection may be achieved, for example, by a suitable screwed or clamped connection. This results not only in an advantage in terms of the assembly and construction of the electromagnet, but an advantage is also achieved in terms of the operation of the device. By virtue of the separate design, a substantial thermal decoupling of the electromagnet or the coil on the one hand and the armature assembly on the other hand is achieved. Since thermal conduction takes place essentially through direct contact of these two assemblies, it is possible to reduce the thermal contact by dispensing with or reducing a direct connection, whereby the thermal problems in particular at the high frequencies described can be significantly diminished, leading to an increase in the reliability of the device. As an alternative to this, however, it is also possible to construct the device as a non-separable unit. In this case, for example, fixed, unreleasable connections are used. The assemblies to be connected to one another are in this case, for example, welded or mechanically caulked to one another. A common plastic encapsulation or the like may also be provided in order to connect the assemblies fixedly to one another.

A further advantage is achieved if the armature assembly is connected to a control element, for example for a valve. In connection with the modular construction of the invention, the control element, for example for a valve or another, also mechanically designed element, is favorably combined with the armature assembly. By virtue of the exchangeability, the coil assembly can cooperate with differentially dimensioned armature and/or control elements. It is thus possible to cover a wide range of applications for these electromagnets with a small number of assemblies.

For the movement of the armature, damping elements are provided, the damping elements being arranged, substantially stationarily, either on the moving armature or on steps of the armature guide. An optimal damping is achieved by comparatively large-area and/or large-volume damping elements. By suitably selecting the damping elements, in particular as regards the material of the surfaces and the volume of the damping element, it is possible to set the wear characteristic of the device. It should also be noted in this regard that the selection of the resilient damping element, in combination with the film bearing or the design of the plastic sliding surface of the armature, gives rise to further parameters by which the wear parameters or other requirements can be specifically set.

It is advantageous in this regard if the function of the damping element is combined with a sealing function, in particular if the damping element serves as a sealing plate for the sealing of the valve opening. The dual functionality of the damping element means a saving of space for the comparatively small devices.

It has proved advantageous if the armature running surface or the sliding film consists of polytetrafluoroethylene (PTFE). This material exhibits very low adhesion, i.e. ability to become attached or to stick. Surfaces or sliding films produced from such a material act like a "ball bearing". These surfaces allow a smooth running of the movable part. The reduction of the mechanical resistances, i.e. the frictional resistances, favorably affects the achievable accelerations and thus the achievable switching times. At the same time, the film is not very thick, which means a saving of space, and by virtue of the low specific gravity the proportion by weight for the bearing is also very low.

Further advantageous designs of the invention are described hereinafter and shown in the accompanying drawings.

DETAILED DESCRIPTION OF PREFERRED EMBODIMENTS

Figure 1:
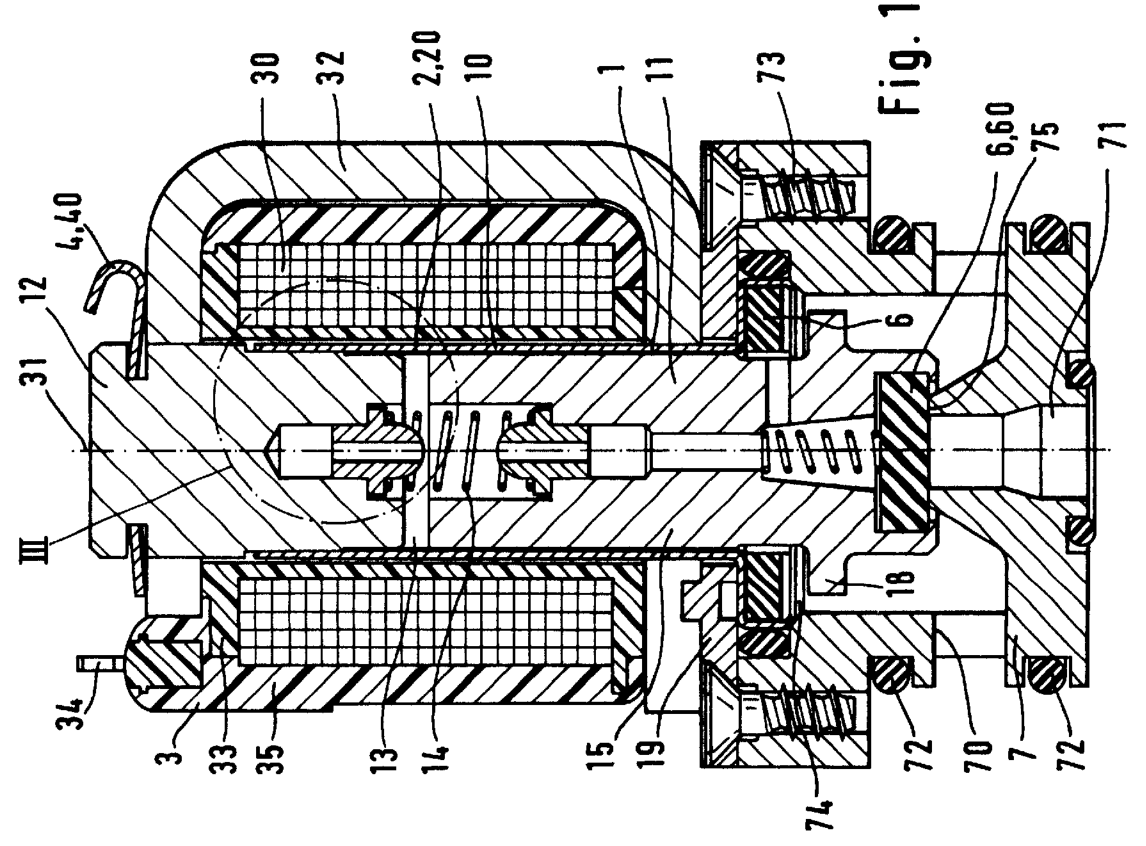
FIG. 1 is a vertical section through a first embodiment of the electromagnet according to the invention.

FIG. 1 shows a schematic representation of a first embodiment of the electromagnet according to the invention.

By virtue of the modular construction, there is an armature assembly 1 and a coil assembly 3.

The coil assembly 3 comprises in this case the coil former 30, which carries the wire windings. The coil 30 is connected by electrical contacts 34 to a suitable electric current supply. The winding is wound on a coil former 33, the coil former 33 being provided in a substantially rotationally symmetrical relationship to the coil axis 31.

The modular construction also continues within the coil assembly. The coil 30, which is surrounded by a plastic casing 35, is in this case pushed into the frame 32 in a substantially perpendicular relationship to the coil axis 31. The frame 32 has in this case an opening at each of the two arms for passing through the coil assembly 3. The coil 30 can thus easily be released from the frame 32. The frame 32 serves, for example, for fastening purposes. In a variant, the frame 32 may also be surrounded by a plastic casing.

Figure 5:
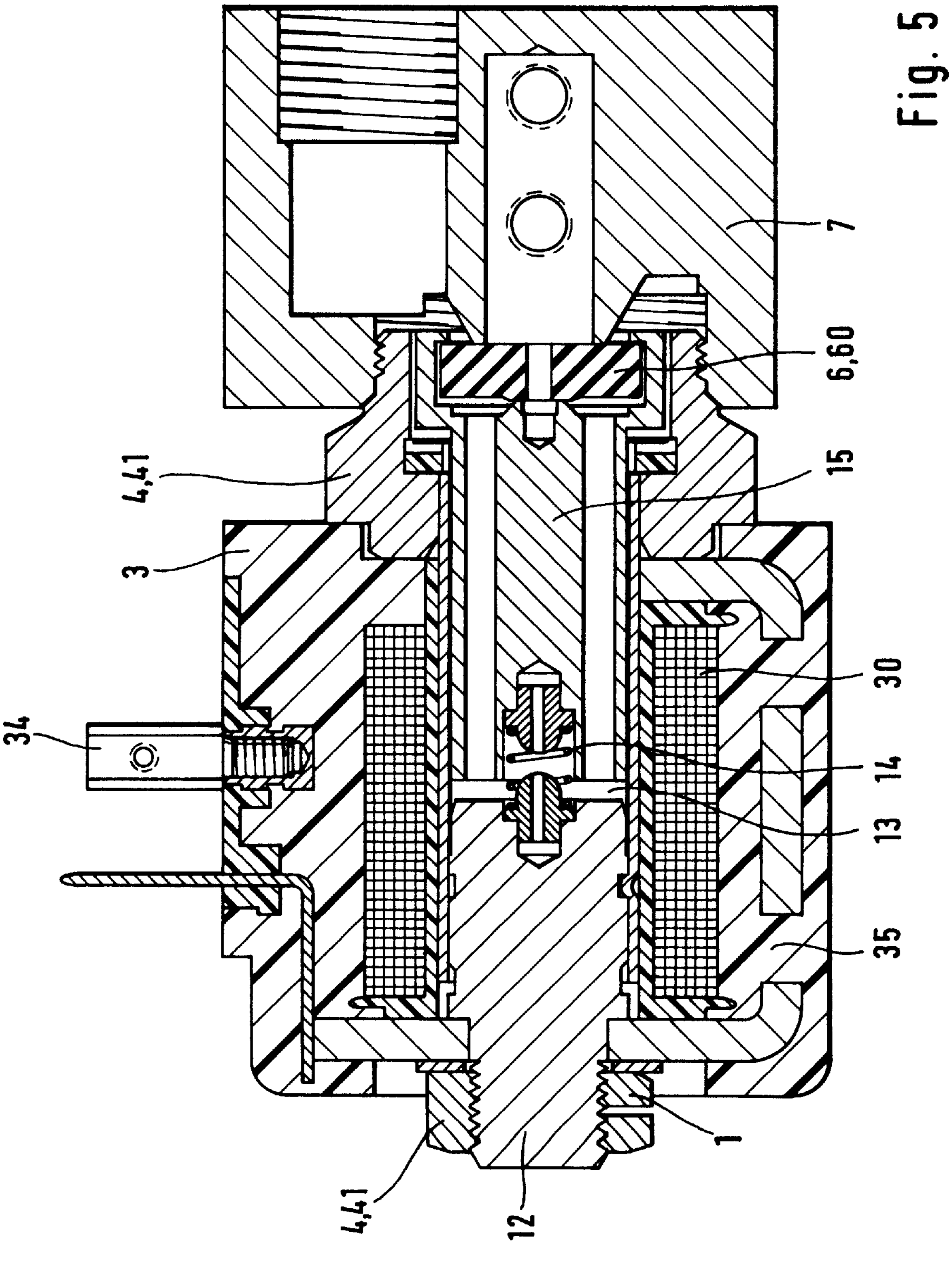
FIG. 5 is a view similar to FIG. 1 of a fourth embodiment of the electromagnet according to the invention.

The coil assembly 3 is connected to the armature assembly 1 by the connection 4. A clamping ring 40 is provided, for example, as the connection 4. This clamping ring may, however, also be designed as a screwed connection 41 (FIG. 5). In particular a releasable connection is provided as the connection in this case. As a result, the armature assembly 1 and the coil assembly 3 can also be easily demounted again, for example when the device has to be repaired or overhauled.

The armature assembly 1 also comprises a plurality of elements. Provided on the armature assembly 1 is the tube 10, which can be introduced into the coil assembly 3 in a coaxial relationship to the coil axis 31. The tube 10 is in this case introduced through the appropriate bores of the frame 32 into the coil assembly 3, which has been previously inserted into this frame.

At its upper end, the tube 10 has the core 12, which provides magnetic guidance for the magnetic field generated by the coil 30. The core 12 projects here into the interior of the coil 30.

Figure 3:
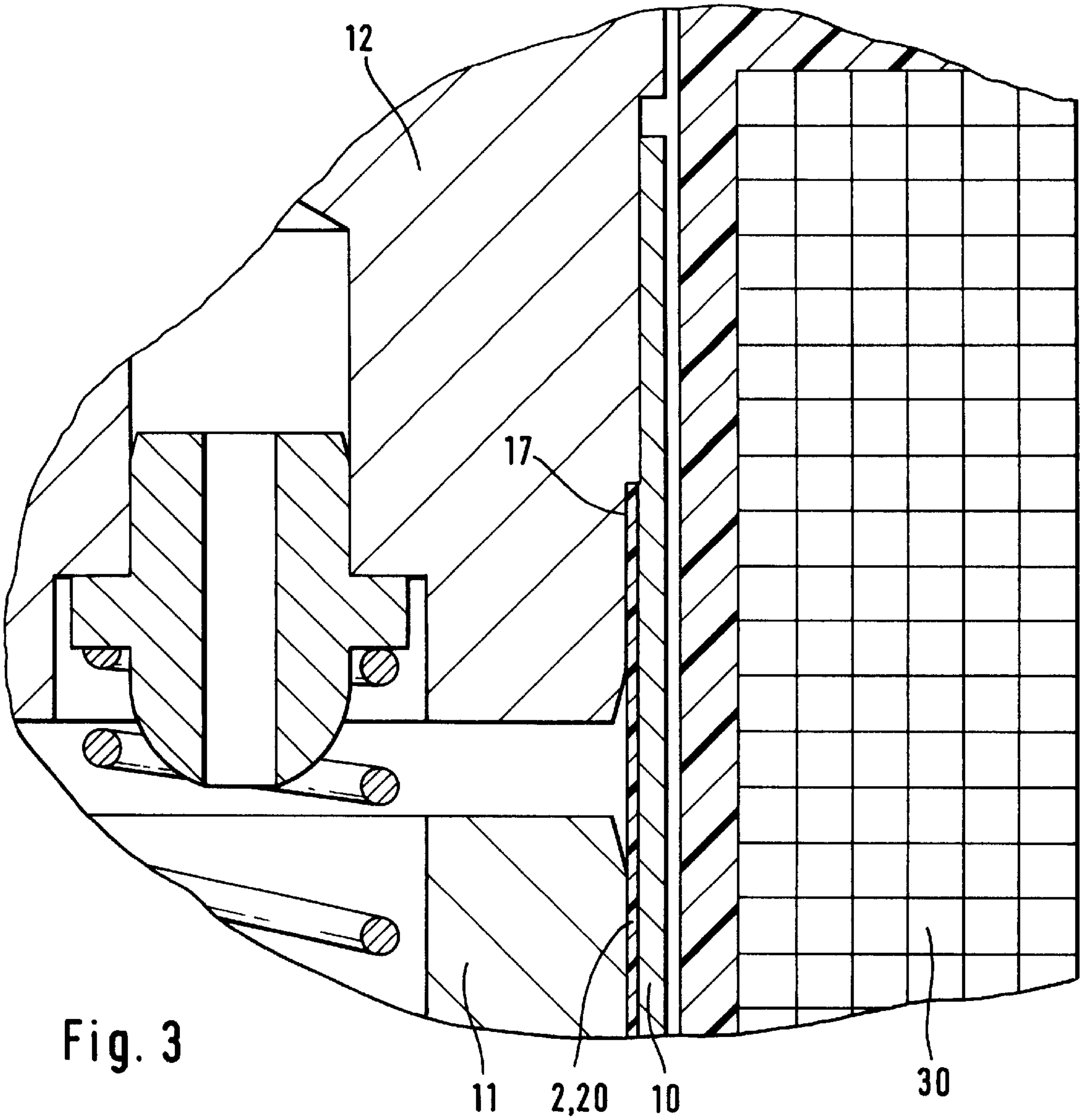
FIG. 3 shows an enlarged detail indicated by III in FIG. 1.

The tube 10 serves for guiding the armature 11. The armature 11 does not run directly on the inner wall of the tube 10 in this case, but, as example shown in FIG. 1, on a sliding surface 2 or a sliding film 20. This is shown in an enlarged representation in FIG. 3. The tube 10 is in this case pushed onto the core 12 and caulked or welded. In the lower, inner region of the core 12, a peripheral gap 17 (FIG. 3) produced by simple turning-off of the core 12 is provided in the lateral surface.

The film 20 projects into the gap 17. By a certain clamping of the film 20 in the gap, the film is held at the periphery. The film consists of polytetrafluoroethylene and has the effect that the movable armature body 15 runs smoothly on the inner surface of the tube 10. Besides using a film 20, it is also possible to produce the inner surface of the tube either from a suitable plastic or to apply a suitable coating to the tube. The use of the film is simple insofar as the film can be easily produced in different thicknesses and made to the appropriate dimension. Owing to the film being clamped in the gap 17, the film is also reliably held. Since the guiding function is performed by the film, the quality of the inner surface of the tube no longer has to meet exacting requirements, thereby considerably reducing the production costs of the tube, since the tube can be machined using a simpler tool and in particular there is no longer any need for subsequent surface treatment, for example grinding or polishing.

According to the design shown in FIG. 1, an element, the tube 10, has been inserted into the coil former 30, this element being separate from the latter and being required to take on the task of guiding the armature. The proposal, according to the invention, of a sliding-film arrangement is also applicable, however, in the case of electromagnets in which the coil former has a recess in its interior and at the same time serves as the running surface for the armature. The invention may be advantageous particularly in the case of such designs, since besides the improved magnetic guidance it is also possible to introduce the tube more precisely. The use of the sliding film may also be exploited to compensate for production-related inaccuracies in the bore in the coil. In this variant of the invention, an additional element, the fabrication of which must be precise and is relatively costly, namely the tube, is thus dispensed with and replaced by the design according to the invention, and a smooth-running and at the same time wear-resistant electromagnet is obtained. The result of this is an advantageous design of the invention such that the plastic sliding surface is provided on the tube and/or the coil former or the bore in the coil former. It is also possible to arrange the tube 10 not over the entire length of the coil former or its bore and to guide the armature in certain sections either by the tube or the coil former. The plastic sliding surface is provided between the armature body and the tube or the coil former, for example, in the form of a coating of a separate element or a film.

The mode of operation of the electromagnet according to the invention is essentially as follows:

The magnetic field generated by the coil 30 moves the movable armature 11 or armature body 15, as a rule against the force of a restoring spring 14, such that the air gap 13 is closed upon supplying the coil 30. As a result of the travel corresponding to the air gap 13, a device connected thereto, for example a valve or some other element can be accordingly controlled, opened or moved. If the current through the coil 30 is switched off, the magnetic field collapses, whereby the magnetic forces of attraction become less than the spring force of the restoring spring 14 and the restoring spring 14 presses on armature away from the core 12 again such that an air gap 13 exists.

The movement of the armature 11 or of the armature body 15 is limited in particular by damping elements 6.

In its lower part, the armature body 15 has a flange 18. This flange 18 cooperates with a damping element 6 located above and adjacent to the flange 18. The damping element 6 surrounds the armature 11 annularly in this case. Preferably, the damping element 6 is in this case fixed, that is to say does not move with the armature 11, in order thereby not to increase the moving mass unnecessarily. It is, however, also possible to design the damping element 6 so as to be movable with the armature 11 or the armature body 15. This is advantageous particularly when an additional function, for example a sealing function, is to be triggered by the movement of the damping element 6. The damping element is used to absorb the upwardly directed kinetic energy of the armature in cooperation with the annular plate. The annular plate 19 in this case connects the tube 10, on which the annular plate is integrally formed, to the valve body 7. Screws 73 are provided for this purpose. In its upper end directed towards the tube 10, the valve body 7 in this case has in the inner region a recess which is so designed that the damping element 6 can be received. This recess 74 is bounded by the annular plate 19.

In order to damp the downwardly directed kinetic energy of the armature 11, a damping element 6 which acts as a sealing plate 60 is let into the armature 11 at the lower end face thereof. FIG. 1 shows in this case the closed position of an electromagnetic valve, the sealing plate 60 cooperating sealingly with the sealing surface 75 at the outlet opening 71 of the valve body 7. As a result, the inlet opening 70 is separated and cut off from the outlet opening 71 of the outside of the valve body 7, seals 72 are provided to connect and link the electromagnetic valve tightly to the media circuit (for example liquid circuit) which is being switched and controlled.

It has advantageously been found in this case that the design according to the invention has led to a long service life of the device and a high degree of reliability coupled with high efficiency, even with regard to different media.

It is known that dried air often has an abrasive action on the bearing and leads to preferential wear. The use in oil sludges may, under certain circumstances, also be disadvantageous to the service life of the device. It has now been found by using the plastic running surface or the sliding film that these function reliably even in a wide variety of operating media.

Figure 2:
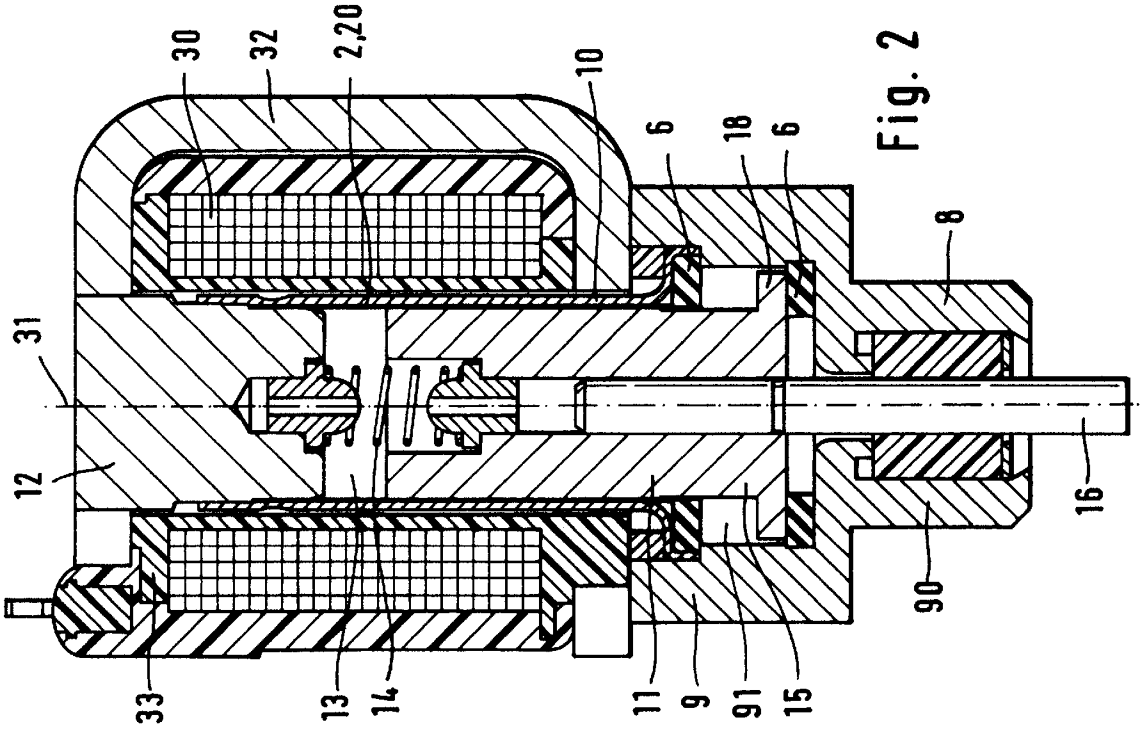
FIG. 2 is a view similar to FIG. 1 of a second embodiment of the electromagnet according to the invention.

FIG. 2 shows another design of the electromagnet according to the invention. In FIG. 1 the valve body is used to switch a hydraulic or else pneumatic arrangement, while in FIG. 2 there is provision for the armature rod 16, which is connected to the armature 11 or the armature body 15, to transmit a corresponding movement to an element, which is not illustrated more specifically. Such an electromagnet may be used, for example, in textile machines. In other respects, the construction is essentially identical to the construction according to FIG. 1.

In this case, it should be noted that the damping elements 6 are each designed so as not to move with the armature body 15, but so as to be substantially stationary. The flange 18 of the armature body 15 in this case runs against the upper and the lower damping element 6. Once again, a recess 91 in which the flange 18 moves up and down is provided in the assembly 9, which also forms a guide 90 for the armature rod 16. The guide 90 is in this case provided in an armature-rod guide 8 and is situated at the lower end of the electromagnet. In a variant of the invention, it is, of course, also possible for the damping element to move along with the armature body 15. The movement of the armature 11 is in this case absorbed by the damping elements 6, further elements of the electromagnet, in particular elements connected to the coil assembly 3, serving as abutments and compensating part of the kinetic energy.

The upper damping element 6 in this case serves as a fastening for the film 20, such that, after the film 20 has been inserted into the tube, the film is drawn radially outwards in the recess 91 and firmly clamped by the axially pushed-on damping element 6.

The damping element 6 or the sealing plate 60 are formed from suitable, flexible plastic. By selecting these materials and selecting the quality of the sliding film 20 or the thickness of the sliding film 20, it is possible to set the wear parameters of the electromagnet and the smooth running or the service life in accordance with the intended use.

In FIGS. 1 and 2 the restoring spring 14 is arranged in the region of the air gap 13. There may also be provision for the bearing of the restoring spring 14 to be equipped with further damping elements.

Figure 4:
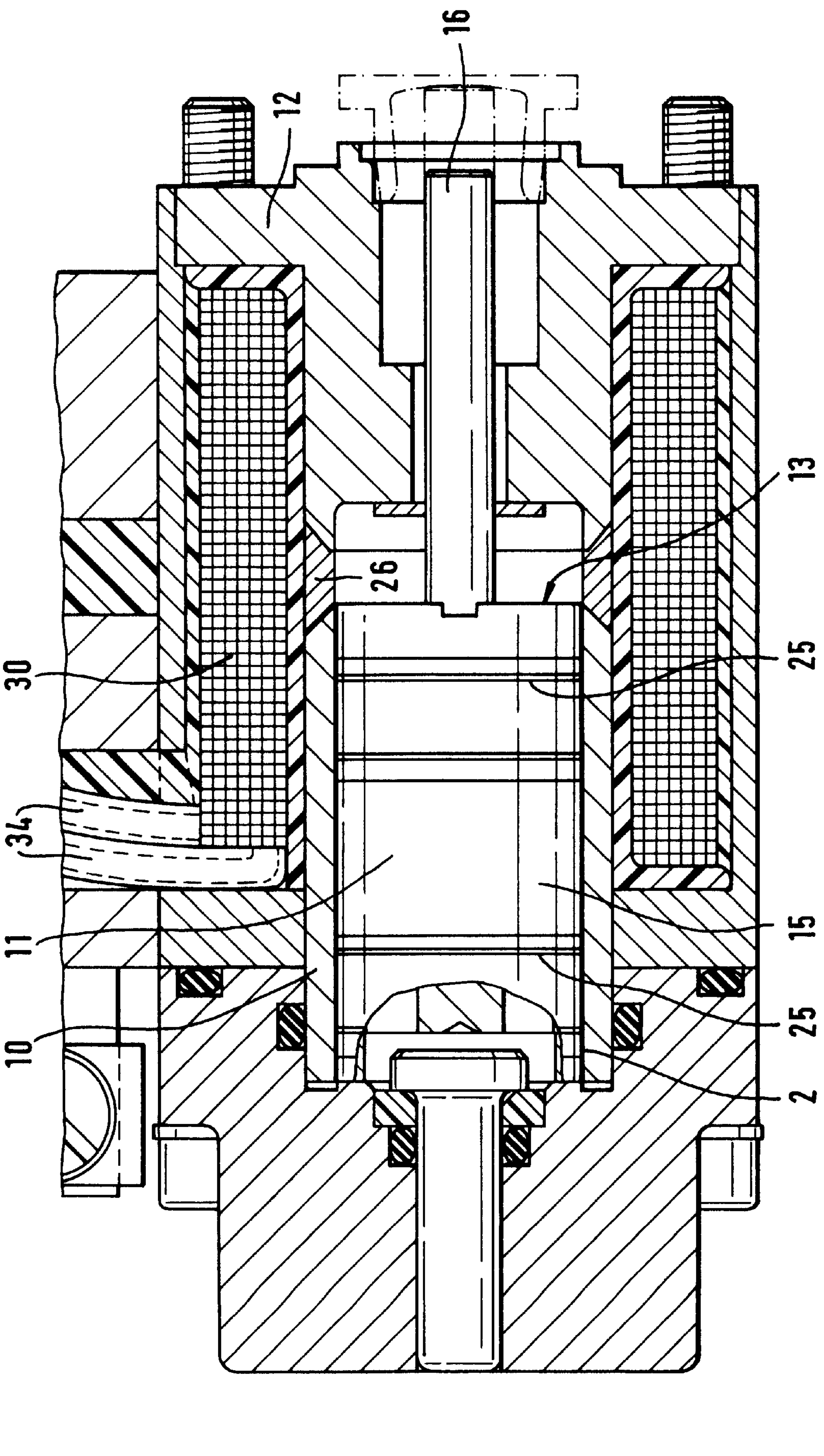
FIG. 4 is a view similar to FIG. 1 of a third embodiment of the electromagnet according to the invention.

FIG. 4 illustrates a further variant of the invention. The armature rod 16 is in this case guided in the core 12. Upon attraction of the armature 11, the armature rod 16 is in this case displaced towards the right, whereby the air gap 13 is closed. In contrast to the design according to FIG. 2, here when current is supplied the armature rod 16 moves out, while in FIG. 2 the armature rod 16 is drawn into the electromagnet.

Here, too, the construction is otherwise identical to that in the example according to FIGS. 1, 2. That is to say, the tube 10 is equipped, as part of the armature assembly 1, with an internal sliding film 2. The armature 11 or the armature body 15 slides on the sliding film 2. In order to improve the sliding properties, the armature body 15 has a plurality of sliding rings 25. The sliding rings consist in this case of a bronze alloy which is welded or deposited on the armature body 15.

The tube 10 is interrupted in the region of the air gap 13 by an annular tube element 26 which may consist of a different material. By varying magnetizable, ferromagnetic or nonmagnetic materials in this region, the switching characteristic of the magnet can be influenced accordingly. The annular tube element 26 is in this case incorporated, for example soldered or welded, into the tube during the production of the latter and turned off thereafter.

FIG. 5 shows a further example of the magnet according to the invention. In this case, an electromagnet is presented which is constructed in the same way as the examples according to FIGS. 1, 2 and 4. The electromagnet in this case is a valve magnet in which, once again, a sealing plate 60, which also serves as the damping element 6, is used to close or open a valve opening. This magnet too is of modular construction, that is to say the armature assembly 1 is arranged so as to be releasable in a simple way from the coil assembly 3. This is effected, for example, by the connecting means 4, 41 which are equipped in this case with an internal or external thread in form of nuts.

Although the invention has been described in terms of specific embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. An electromagnet comprising:

an exchangeable armature guide tube positioned in said electromagnet, a coil positioned in said electromagnet so as to surround said armature guide tube, said coil for generating a magnetic field, an armature, movably mounted in said armature guide tube, for moving when said coil is supplied with current, the armature serving for control of an element, at least two damping elements for damping the movement of said armature in at least two directions, an exchangeable sliding film of plastic material, positioned between said armature and said armature guide tube, for facilitating the movement of said armature, and said electromagnet having a modular construction in which separate first and second assemblies are provided, the first assembly being for said armature and said armature guide tube and the second assembly being for said coil, and said first and second assemblies being releasably connected wherein said sliding film of plastic material has a bottom edge and is stretched and clamped in position by means of one of said at least two damping elements in order to fix the bottom end of the film.

2. Electromagnet according to claim 1, comprising:

a clamping element for clamping said exchangeable sliding film of plastic material in place by clamping it in the armature guide tube.

3. Electromagnet according to claim 2, wherein said exchangeable sliding film of plastic material has a top edge and the top edge of the film is clamped by said clamping element.

4. Electromagnet according to claim 3, wherein said armature has sliding rings made of bronze alloy which cooperate with said armature guide to be.

5. Electromagnet according to claim 1, wherein said first assembly can be introduced into said second assembly in a coaxial relationship to the axis of said coil and can be fastened by a screwed connection.

6. Electromagnet according to claim 1, wherein said first assembly is connected to a control element and said control element is a valve.

7. Electromagnet according to claim 1, wherein one of said at least two damping elements is arranged on said armature and is servable as a sealing plate for sealing of a valve opening.

8. Electromagnet according to claim 1, wherein said plastic sliding surface consists of polytetrafluoroethylene (PTFE).

* * * * *